United States Patent
Chellappa et al.

(10) Patent No.: US 9,219,722 B2
(45) Date of Patent: Dec. 22, 2015

(54) UNCLONABLE ID BASED CHIP-TO-CHIP COMMUNICATION

(71) Applicant: International Business Machines Corporation, Armonk, NY (US)

(72) Inventors: Srivatsan Chellappa, Tempe, AZ (US); Toshiaki Kirihata, Poughkeepsie, NY (US); Sami Rosenblatt, White Plains, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/102,607

(22) Filed: Dec. 11, 2013

(65) Prior Publication Data

US 2015/0163211 A1   Jun. 11, 2015

(51) Int. Cl.
H04L 29/06 (2006.01)
G06F 21/31 (2013.01)

(52) U.S. Cl.
CPC ............ *H04L 63/08* (2013.01); *G06F 21/31* (2013.01)

(58) Field of Classification Search
CPC ............ G06F 21/31; G06F 2221/2113; H04L 9/0866
USPC ......................................................... 713/155
See application file for complete search history.

(56) References Cited

U.S. PATENT DOCUMENTS

| | | | |
|---|---|---|---|
| 4,924,210 A | 5/1990 | Matsui et al. | |
| 6,028,937 A * | 2/2000 | Tatebayashi et al. | 713/169 |
| 6,826,690 B1 * | 11/2004 | Hind et al. | 713/186 |
| 7,711,113 B2 | 5/2010 | Takahashi et al. | |
| 7,716,482 B2 | 5/2010 | Jung et al. | |
| 8,386,990 B1 | 2/2013 | Trimberger et al. | |
| 2004/0098585 A1 * | 5/2004 | Grove et al. | 713/168 |
| 2005/0188193 A1 * | 8/2005 | Kuehnel et al. | 713/155 |
| 2006/0034462 A1 * | 2/2006 | Lee | 380/277 |
| 2007/0092011 A1 | 4/2007 | Ciccarelli et al. | |
| 2008/0189772 A1 | 8/2008 | Sims et al. | |
| 2009/0083833 A1 | 3/2009 | Ziola et al. | |
| 2012/0091596 A1 | 4/2012 | Su et al. | |

(Continued)

FOREIGN PATENT DOCUMENTS

| | | |
|---|---|---|
| DE | 102010039782 | 3/2012 |
| JP | 2012032843 | 2/2012 |

(Continued)

OTHER PUBLICATIONS

Rosenblatt et al., "Field Tolerant Dynamic Intrinsic Chip ID Using 32 nm High-K/Metal Gate SOI Embedded DRAM", IEEE Journal of Solid-State Circuits, vol. 48, No. 4, Apr. 2013, pp. 940-947.

(Continued)

*Primary Examiner* — Dao Ho

(74) *Attorney, Agent, or Firm* — Catherine Ivers; Hoffman Warnick LLC

(57) ABSTRACT

A first copy of an intrinsic ID of a first node may be stored on a second node. The first node may receive a challenge that causes it to generate a second copy of its intrinsic ID. The second copy and a random value may be used as inputs of a function to generate a first code. The first code is transmitted to the second node. The second node decodes the first code using its local copies of the random value and/or the intrinsic ID. The second node checks the decoded information against its local information and authenticates the first node if there is a match.

18 Claims, 9 Drawing Sheets

(56) References Cited

U.S. PATENT DOCUMENTS

2012/0246470 A1* 9/2012 Nicolson et al. ............... 713/158
2013/0133031 A1* 5/2013 Fainstein et al. ................. 726/2

FOREIGN PATENT DOCUMENTS

| JP | 2012073954 | 4/2012 |
|----|------------|--------|
| WO | 2006067739 A2 | 6/2006 |
| WO | 2006078730 | 7/2006 |

OTHER PUBLICATIONS

Lee et al., "On-Chip Communication Architecture Exploration: A Quantitative Evaluation of Point-to-Point, Bus, and Network-on-Chip Approaches", ACM Transactions on Design Automation of Electronic Systems, vol. 12, No. 3, Article 23, Publication date: Aug. 2007, pp. 1-20.
Chellappa et al., "Improved Circuits for Microchip Identification using SRAM Mismatch", 2011 IEEE.
Mell et al., "The NIST Definition of Cloud Computing", Version 15, Oct. 7, 2009.
Ravikanth, "Physical One-Way Functions", Massachusetts Institute of Technology, Mar. 2001, pp. 1-154.
Suh et al., "Physical Unclonable Functions for Device Authentication and Secret Key Generation", DAC 2007, Jun. 4-8, 2007, pp. 9-14.
Clarke, "Dialog signs up to use Intrinsic-ID on-chip security", EE Times, Apr. 27, 2012, http://www.eetimes.com/electronics-news/4371850/Dialog-uses-Intrinsic-ID-security.
Barker et al., "Recommendation for Random Number Generation Using Deterministic Random Bit Generators", NIST Special Publication 800-90A, Jan. 2012, pp. 1-128.
Barker et al., "Computer Security", NIST Special Publication 800-57, Recommendation for Key Management—Part 1: General, (Revision 3), Jul. 2012, pp. 1-147.
Great Britain Intellectual Property Office, Combined Search and Examination Report under Sections 17 and 18(3) for Application No. GB1421545.3 mailed Jun. 3, 2015, 9 pages.

* cited by examiner

UNCLONABLE ID BASED CHIP-TO-CHIP COMMUNICATION

FIELD

The present application relates generally to electronic communications, and more particularly to authentication protocols for electronic communications between electronic devices.

BACKGROUND

Electronic communications between a sender and a receiver may include one or more levels of security or authentication, including confirming respective identities of the sender and receiver, and encrypting the data communicated between them. Some conventional methods use an ID and a password for authentication. Communications may be protected by encryption using public and private keys. However, when the ID and password are known by an unauthorized sender or receiver, an unauthorized access or an unauthorized communication is possible. Accordingly, it may be desirable to implement a communication protocol to protect an electronic system from an unauthorized access or use.

BRIEF SUMMARY

Embodiments of the present disclosure include a method, system, and computer program product for authenticating a node in an electronic communications system. An authentication request is received from a node. A generating challenge is transmitted to the node, wherein the generating challenge prompts the node to generate a first code representing an output of a first encryption challenge having inputs that include a first random value and a first intrinsic ID based on an intrinsic feature. The first code is received from the node in response to the generating challenge. A second code is generated, wherein the second code represents an output of a second encryption challenge having inputs that include at least two of: the first code, a second random value, and a second intrinsic ID, wherein the second intrinsic ID is obtained from a source other than the node. The node is authenticated based on one or more of: (a) the second encryption challenge having inputs of the second random value and the second intrinsic ID, and the second code matching the first code; (b) the second encryption challenge having inputs of the first code and the second random value, and the second code matching the second intrinsic ID; and (c) the second encryption challenge having inputs of the first code and the second intrinsic ID, and the second code matching the second random value; whereby the first random value matches the second random value and the first intrinsic ID matches the second intrinsic ID.

Further features as well as the structure and operation of various embodiments are described in detail below with reference to the accompanying drawings. In the drawings, like reference numbers indicate identical or functionally similar elements.

DETAILED DESCRIPTION

Figure 1:
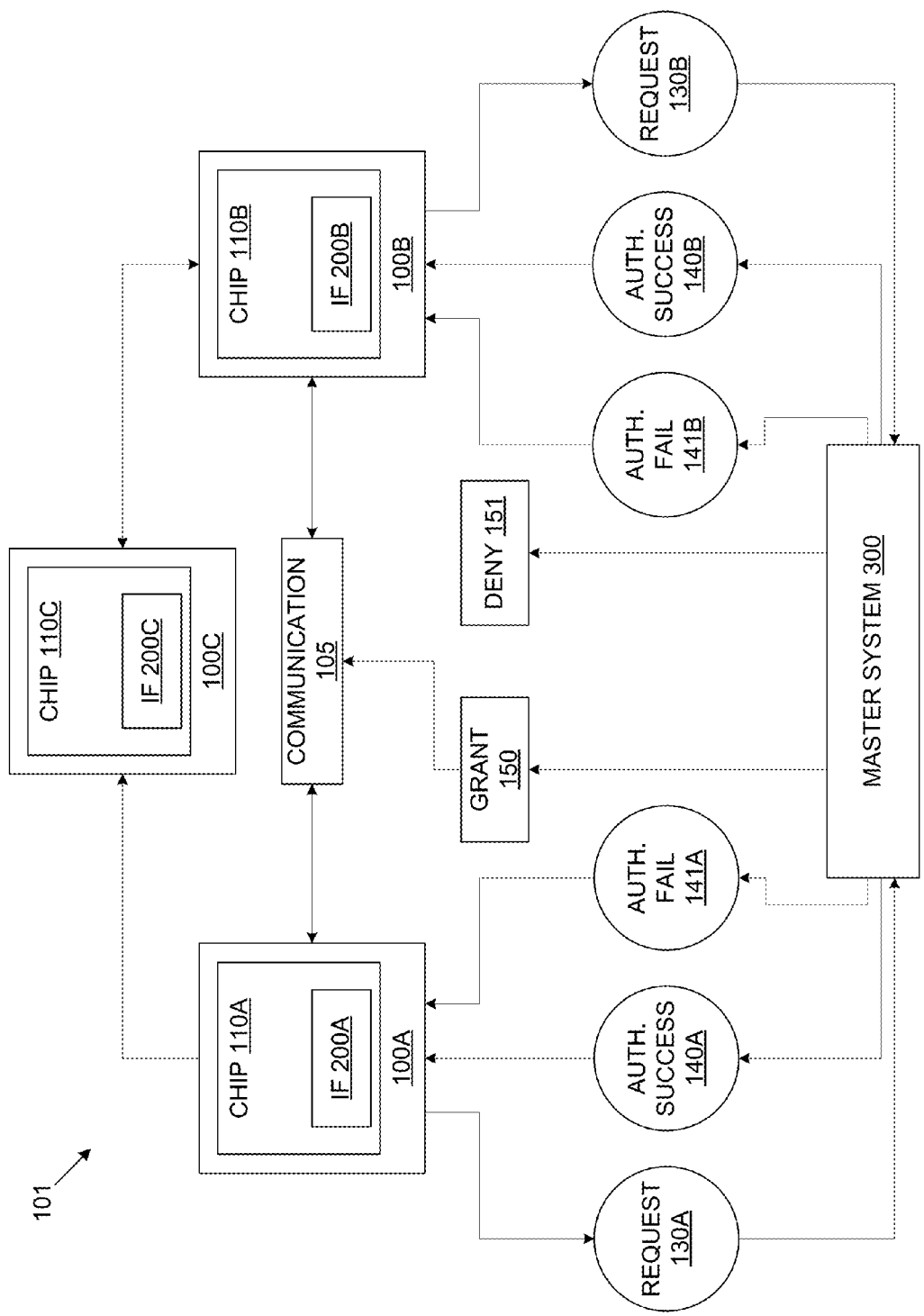
FIG. 1 is a schematic block diagram depicting a communications system, in accordance with embodiments of the present disclosure.

FIG. 1 is a schematic block diagram depicting a communications system 101, in accordance with embodiments of the present disclosure. Referring now to FIG. 1, an embodiment of the present disclosure includes an intrinsic ID based chip-to-chip communication system 101. The communications system 101 may enable secure communication between two or more nodes 100, including for example, Nodes 100A, 100B, and 100C. Each such node 100 may include a communicating device or chip 110, for example the chips 110A, 110B, and 110C, respectively. In a related embodiment, the chip 110 may be a constituent component of a corresponding communicating device. Each chip 110 may have unique intrinsic features (IFs) 200 or characteristics that may be used to generate one or more corresponding intrinsic IDs given corresponding generating challenges. For example, an IF of a chip 110 may be a power-up voltage value of SRAM, ring-oscillator physical unclonable functions (PUFs) pairings, or DRAM retention fail counts. In general, an IF 200 of a chip 110 may be a unique physical characteristic of a chip 110 that cannot be replicated in other chips. A generated intrinsic ID may be, for example, a digital binary vector generated such as {0010100001111 . . . 1101}.

Several methodologies, mechanisms, and systems may be employed to generate one or more unique and difficult to replicate intrinsic IDs of a chip 110 using its IF 200, in response to a generating challenge. As described in more detail below, a generating challenge may be designed to evoke an intrinsic ID response from a chip 110 that is both unique to that chip and also to the generating challenge. The intrinsic ID generated in response to the generating challenge may be, for example, a digital binary vector. A different chip 110 would not be able to produce the same intrinsic ID response for a given generating challenge, as the intrinsic ID is derived from IF(s) 200 of the chip 110. IFs 200 used to generate an intrinsic ID may be invariant over time and other field conditions. An intrinsic ID generated based on the IF 200 of a chip 110 is uniquely dependent on some intrinsic property of the chip such that a different chip using the same challenge would be unable to produce either the same intrinsic ID or a close approximation of that intrinsic ID. In some embodiments, a chip 110 may generate large numbers of such intrinsic IDs, based on multiple generating challenges, to enable the use of a different intrinsic ID during each authentication and/or communication of/by the chip 110, further strengthening security.

One implementation for generating a unique intrinsic ID of a chip is described in U.S. Patent Publication 20130133031 A1, titled "Retention Based Intrinsic Fingerprint Identification Featuring a Fuzzy Algorithm and a Dynamic Key" by Fainstein et al., published May 23, 2013, ("Fainstein 2013") incorporated herein by reference in its entirety.

An additional implementation of generating a unique intrinsic ID of a chip is described in "Field Tolerant Dynamic Intrinsic Chip ID Using 32 nm High-K/Metal Gate SOI Embedded DRAM" by Rosenblatt et al., published in the IEEE Journal of Solid-State Circuits, Vol. 48, No. 4, April 2013, ("Rosenblatt 2013") incorporated herein by reference in its entirety.

A further implementation of generating a unique intrinsic ID of a chip is described in "Improved Circuits for Microchip Identification using SRAM Mismatch" by Chellappa, et al., Custom Integrated Circuits Conference (CICC), 2011 IEEE, ("Chellappa 2011") incorporated herein by reference in its entirety.

A further implementation of generating a unique intrinsic ID of a chip is described in "Physical Unclonable Functions for Device Authentication and Secret Key Generation" by Suh et al., Proceedings of the 44$^{th}$ Annual Design Automation Conference (ACM), 2007, ("Suh 2007") incorporated herein by reference in its entirety.

An additional implementation for generating a unique intrinsic ID of a chip is described in "Physical One-Way Functions" by Ravikanth et al., PhD dissertation, Massachusetts Institute of Technology, 2001, ("Ravikanth 2001") incorporated herein by reference in its entirety.

While the chips 110 contain intrinsic features IF 200, their corresponding intrinsic IDs are not maintained on the chips 110 themselves or the nodes 100 that contain the chips 110. Rather, the chips 110 are capable of generating intrinsic IDs using their respective IFs 200. IFs 200 of chips 110A, 110B, and 110C, depicted in FIG. 1 may be, for example, IF 200A, IF 200B, and IF 200C, respectively.

Authentication of nodes 100 and/or communications between them may be facilitated by a Master System 300, which may be, for example, an original equipment manufacturer (OEM) or a network administrator. The Master System 300 may maintain a record (i.e., a copy) of intrinsic IDs of the chips 110 (i.e., intrinsic IDs that are based on corresponding IFs 200 of the chips 110 on the nodes 100). These copies maintained in the Master System 300 record may be obtained as follows: a generating challenge may be presented to a chip 110, in response to which the chip 110 generates a copy of an intrinsic ID using an IF 200 of the chip 110. The generated copy of the intrinsic ID of the chip 110, along with the challenge used to generate it, may be stored in the Master System 300 record. Thereafter, as will be described below, the Master System 300 record may be queried to obtain the stored copies of the chip 110 intrinsic ID(s). The queried copies may then be used to facilitate authentication of the chip 110, the node 100, and/or communications by them.

Where the Master System 300 may be operated by an original manufacturer, records of intrinsic IDs of chips 110 may be assembled from known chip 110 intrinsic IDs. For example, once the chip 110 is manufactured by the original manufacturer, the original manufacturer may generate intrinsic IDs of the chip 110, and store them in a record, as described above. Alternatively, and without limitation, a node 100 and/or chip 110 may be permitted to register with the Master System 300, whereby the Master System 300 receives a record of the intrinsic ID of the registering chip 110 and/or node 100. In a related embodiment, the records/copies of intrinsic IDs of the chips 110 may be stored in a record on a different system in communication with the Master System 300, whereby the Master System 300 may retrieve the copies of intrinsic IDs.

Any of the nodes 100 may send a request 130 to the Master System 300 to authenticate the nodes 100 and/or to permit communication with another node 100 or with multiple nodes 100. For example, Node 100A may send a request 130A to the Master 300, requesting authentication and/or permission to communicate with Node 100B. Similarly, Node 100B may send a request 130B to the Master System 300 requesting authentication and/or permission to communicate with Node 100A, or with another node 100.

Upon receiving the request 130 from a node 100, the Master System 300 may authenticate the node 100 by comparing a generated copy of at least one intrinsic ID of the requesting node's chip 110 (i.e., a copy of the intrinsic ID that is generated as part of the authentication process), generated from the chip's IF 200, with a corresponding stored copy (or copies) of the chip's intrinsic ID, stored in the Master System's 300 record maintained by the Master System 300 or by another system/device to which the Master System 300 has access. The comparison between the generated copy of the intrinsic ID and the stored copy of the intrinsic ID need not be direct, i.e., there may be one or more levels of encryption prior to a comparison, as described in connection with embodiments of the present disclosure, discussed in greater detail below.

The generated copy of the intrinsic ID of the chip 110 on the node 100 sending the request 130 is generated dynamically by the requesting chip 110 (i.e., it is generated as part of an authentication methodology), whereas the corresponding copy stored in the Master System's 300 records is a corresponding copy of the intrinsic ID of the chip 110. If the requesting node 100 is successfully authenticated, a corresponding authentication success message 140 may be communicated by the Master System 300 to the node 100. The Master System 300 may grant 150 permission for a communication 105 between Node 100A and Node 100B to commence. If authentication fails, the Master System 300 may communicate a corresponding authentication fail message 141, and may deny 151 permission for Node 100A to communication with Node 100B.

In further exemplary embodiment, with continued reference to FIG. 1, the process of establishing a chip-to-chip communication 105 may begin, for example, with the Node 100A sending a request 130A to the Master System 300, which may be a request for authentication and/or a request to communicate with Node 100B. The requesting Node 100A may be authenticated by the Master System 300 by confirming the identity of its chip 110A, as described in embodiments of the present disclosure. The Master System 300 may also authenticate the Node 100B. Accordingly, the Master System 300 may authenticate intrinsic IDs of the Nodes 100A and 100B, generated using IF 200A and IF 200B of the chips 110A and 110B, by comparing them to corresponding stored copies in the Master System's 300 records. The request and authentication methodology may be identical for both Node 100A and Node 100B, and can further be extended to other Nodes (100C, etc.) connected to the network of nodes 100 in communication with the Master System 300. If Node 100A and Node 100B are authentic, the Master System 300 may send corresponding authentication success messages (or signals) 140A and 140B to the Nodes 100A and Node 100B, respectively. If the two nodes are not authentic, the Master System 300 may send corresponding authentication fail messages (or signals) 141A and 141B to the Node 100A and Node 10B, respectively. If authentication of both Nodes 100A and 100B are successful, the Master System 300 may grant 150 permission to both the Nodes 100A and 100B to communicate. Otherwise, the Master System 300 may deny 151 communication.

Although references to a Master System 300 in the embodiments of the disclosure describe the Master System 300 as facilitating communications between two or more nodes 100, it is not necessary for the Master System 300 to facilitate such communications beyond authenticating a node 100 involved in a communication. Therefore, according to some embodiments of the disclosure, the Master System 300 may be a stand-alone authenticating system, or may be part of a larger system that performs additional networking and communications functions.

Figure 2A:
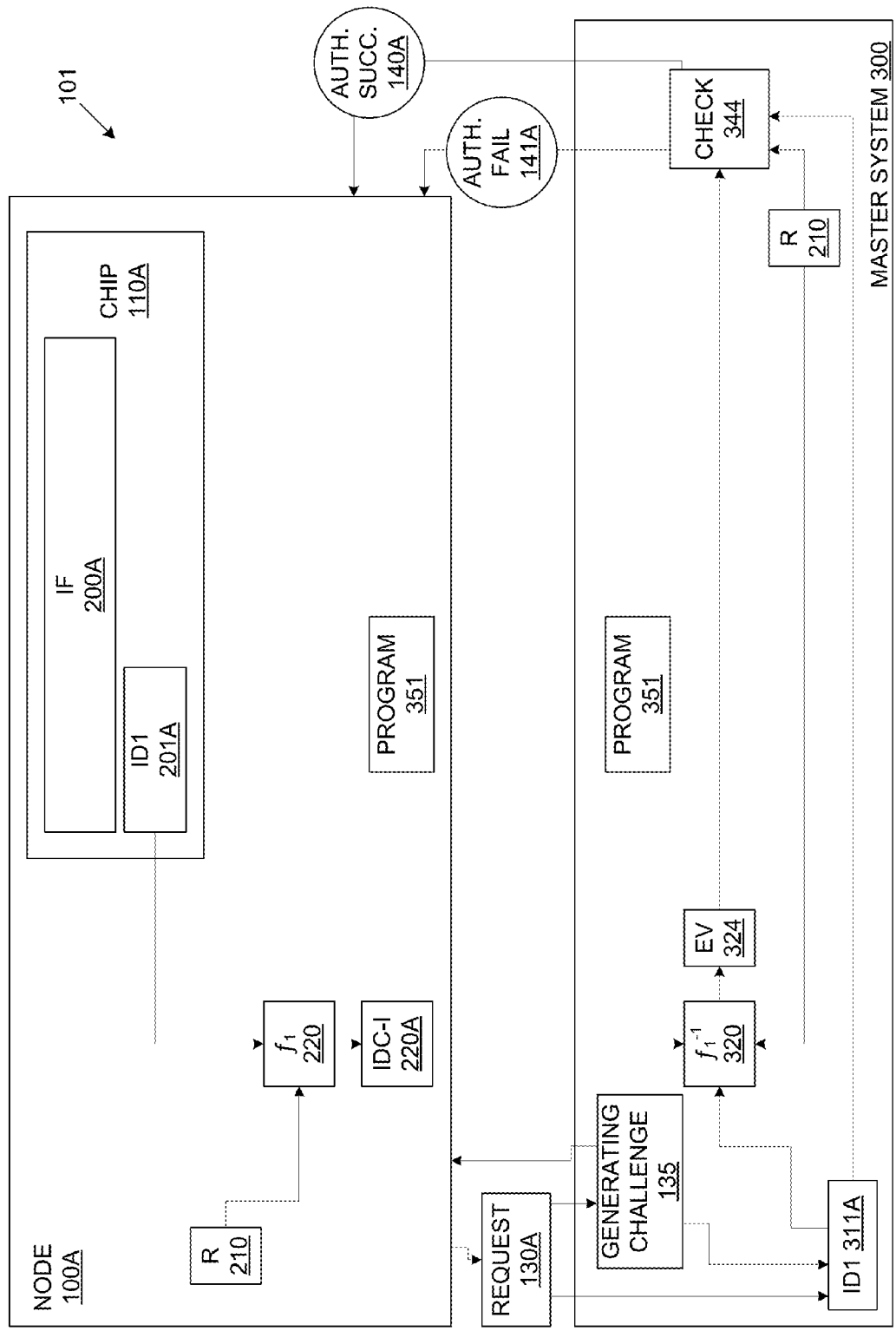
FIG. 2A is a schematic block diagram depicting a communications system using at least one intrinsic ID, in accordance with embodiments of the present disclosure.

FIG. 2A depicts a subset of the communications system 100 of FIG. 1, including the Node 100A and the Master System 300, according to an exemplary embodiment of the present disclosure. To initiate a communication, the node requesting communication, e.g., Node 100A may send a communication request 130A to the Master System 300. This may require Node 100A to identify itself with a unique public identifier such as a MAC address, manufacturer serial number, that could be used to look up Node 100A's ID details in the Master System's 300 database. Functionality of the Node 100A and the Master System 300 may be facilitated by a computer program 351 that operates on or in connection with the Node 100A and/or the Master System 300. The program 351 may send/receive communication requests, facilitate intrinsic ID generation on the Node 100A, facilitate intrinsic ID queries on the Master System 300, perform comparisons of generated and queried intrinsic IDs and/or of encrypted values based thereon. The program 351 may be identical on the Master System 300 and the Node 100A. Alternatively, each may have a different program that performs a subset of the functions described above.

The Master System 300, upon receiving the communication request 130A from Node 100A, may access its database, described in more detail below, to locate Node 100A's intrinsic ID details. The Master System 300 also may select a generating challenge 135 from among a number of available generating challenges, and transmit the selected generating challenge 135 to the Node 100A. The generating challenge 135 may be designed to evoke an intrinsic ID response (e.g., ID1 201A) from the chip 110A that is both unique to that chip and also to the generating challenge 135. The intrinsic ID generated in response to the generating challenge may be, for example, a digital binary vector. A different chip of the same type could not generate the same intrinsic ID (e.g., UD 201A) for the given generating challenge, as the intrinsic ID is derived from unique intrinsic properties of each chip, e.g., IF 200A.

Illustrative and non-limiting examples of the generating challenge 135, as described in, for example, Fainstein 2013, Rosenblatt 2013, Chellappa 2011, and Suh 2007, and Ravikanth 2001, incorporated by reference, above, include: power-up voltage of SRAM, pairings of ring-oscillator PUFs, DRAM retention fail count, a result of a race condition in an arbiter-PUF, or an optical speckle of a disordered three-dimensional microstructure. In the SRAM example, Bit-line and Word-line nodes of each cell may be shorted together to a power supply during power-up of the memory. This challenge of how to power-up the two nodes generates an intrinsic response from each SRAM cell, which may read a high voltage ("1") or a low voltage ("0"). These voltage readings may be used to generate a corresponding unique intrinsic ID of the chip. In the ring-oscillator PUF, the intrinsic frequencies of pairs of ring oscillators on a chip are compared to each other, and the result of the inequality is "1" if the first frequency is larger than the second, and "0" if otherwise. There are N! independent pairings of N ring-oscillators. Choosing which independent pairings to create a digital binary vector can constitute one challenge. As a third example, the retention fail count of DRAM can be adjusted by means of a Word-line low voltage VWL until a target fail count challenge is reached.

In response to the generating challenge 135, the chip 110A may generate an intrinsic ID 201A, which may be a digital binary vector, as described above. The intrinsic ID generated by the chip 110A in response to the challenge 135 may include at least one part using at least one ID1 201A. It may also include two parts using two IDs, for example, ID1 201A and ID2 202A, as described with relation to FIG. 2B, or three parts using three IDs, for example, ID1 201A, ID2 202A and ID3 203A, as described in relation to FIG. 2C. In other embodiments, a single generated ID may be divided into multiple parts for the authentication and/or communication process.

FIG. 2A depicts an embodiment where the generated intrinsic ID of chip 110A comprises a single intrinsic ID component, ID1 201A. Alternatively, Node 100A may use the Master System 300 supplied challenge 135 to generate one internal challenge (or two or three internal challenges in other embodiments) using algorithms that have been previously agreed upon by the Master System 300 and the Node 100A; for example, as part of a configuration file used by components of the communications system 101 to define communications protocols and policies. In embodiments where more than one intrinsic ID is used, each intrinsic ID may be generated in response to a separate generating challenge.

In addition to the generating challenge 135, in response to which Node 100A generates an intrinsic ID, an encryption challenge may be transmitted to the Node 100A from the Master 300. The encryption challenge may be used to encrypt and/or decrypt one or more values that can be used in further authentication functions of the Master System 300 and the Node 100A, as described below. Upon receipt by the Node 100A, the generated ID1 201A along with a randomly generated number R 210 may be input to the encryption challenge. The encryption challenge may be, for example, a mathematical function $f_1$ 220, wherein an output of the function $f_1$ (ID1 201A, R 210) depends on its given inputs. The function $f_1$ 220 may be transmitted to the Node 100A as an encryption challenge by the Master System 300, or it may be a predetermined function accessible to both the Node 100A and the Master System 300. The random number R 210 (which may be a vector) may be predetermined and stored in the corresponding chip 110A or Node 100A, or it may be generated dynamically by Node 100A or chip 110A using, for example, a system time as an input to a predetermined algorithm using the encryption challenge, or a seed to a random challenge generator, to have unique random numbers 210 during every operation where a random number is required. The random number R 210 may also be generated by a random generator outside of the Node 100A. When the random number R 210 is predetermined and stored in the Node 100A or in the chip 110A, the Master System 300 may also store a local copy of the same random number R 210.

The function $f_1$ 220 may be one that has an inverse function $f_1^{-1}$ 320 which may be used to retrieve one of the original inputs $f_1$ 220 (e.g., ID1 201A or R 210) when the other input is known. The function $f_1$ 220 may also be chosen with the consideration that without prior knowledge of its inputs, it should be difficult to reverse engineer and generate ID1 201A and R 210 using just the output $f_1$ (ID1 201A, R 210).

The function $f_1$ (ID1 201A, R 210) may generate/output a first code IDC-I 220A. Once generated, this code may be transmitted to the Master System 300, or may further be encrypted using any known cryptographic protocol before transmission. Such an encryption protocol may include, without limitation: transport layer security (TLS), Internet Key Exchange, IPsec, Kerberos, Point to Point Protocol, or a protocol using a public-key infrastructure (PKI). In one embodiment, IDC-I 220A may be hashed prior to transmission. When received by the Master System 300, IDC-I 220A represents an output of the function $f_1$ 220. Whether it is in fact an output of the function $f_1$ 220 depends on whether the chip 110A and/or the Node 100A are authentic. Therefore, as described below, the Master System 300 may check IDC-I 220A against another value to determine whether the Node 100A is in fact authentic.

The Master System 300 may receive IDC-I 220A, the output of $f_1$ (ID1 201A, R 210), from chip 110A. Where IDC-I 220A has been encrypted prior to transmission using an encryption algorithm, the Master System 300 may decrypt IDC-I 220A prior to performing other operations using IDC-I 220A. Using IDC-I 220A, the Master System 300 may extract one or more of the original inputs to $f_1$ 220 using the corresponding inverse function $f_1^{-1}$ 320, as described below. The Master System 300 may also query its database records to query the stored copy of the chip 110A intrinsic ID, i.e., ID 311A, which is a copy associated with the Node 100A and the challenge 135 (and ID 312A in FIG. 2B-C, and ID 313A in FIG. 2C in embodiments having more than one ID). ID 311A is a stored copy of the intrinsic ID of the chip 110A: ID1 201A (and ID2 202A (FIG. 2B-C) ID3 203A (FIG. 2C) where more than one ID is used), i.e., it corresponds to the challenge 135. It is the intrinsic ID recorded in the Master System's 300 database, for example, after the chip's manufacture or registration.

The Master System 300 may use the inverse function $f_1^{-1}$ 320 to extract one or both of the inputs of the $f_1$ 220 from the received IDC-I 220A, so long as the Master System 300 has IDC-I 220A and at least one of the two $f_1$ 220 inputs, ID1 201A or R 210. Accordingly, the Master System 300 may attempt to extract R 210 or ID1 201A from IDC-I 220A.

The Master System 300 may attempt to extract the R 210 as follows: it may supply the inverse function $f_1^{-1}$ 320 with IDC-I 220A and ID1 311A to extract a value EV 324 as an output (where EV stands for "Extracted Value"). If Node 100A and its chip 110A are authentic, then ID1 311A should match ID1 201A, and EV 324 should match the R 210 value used by the chip 110A as an input to $f_1$ 220 to generate IDC-I 220A. The Master System 300 may have a local copy of the R 210 that was used by the chip 110A as an input to $f_1$ 220. This may be the case, for example, where the Master System 300 regenerates R 210 internally in the Master System 300, using system time (or obtains it from a random value generator synchronized with the Node 100A), or from another source that is accessible to both the Master System 300 and the Node 100A.

Where a local copy of R 210 is available to the Master System 300, the Master System 300 may perform a check 344 to compare EV 324 to a local copy of R 210. The local copy of R 210 may be obtained from a random generator outside of the Master System 300 and outside the Node 100A, where both the Master System 300 and the Node 100A obtain the random number at the same time, e.g., when the request 130A is made by the Node 100A. Alternatively, the local copy of R 210 may be obtained by a random number generator that is part of the Master System 300, where a synchronized system time is communicated between the Node 100A and the Master System 300 to generate an identical R 210 value. If EV 324 matches the Master System's 300 local copy of R 210, the Master System 300 may generate and send an authenticate success message 140A the Node 100A. Otherwise, the Master System 300 may generate and send an authentication fail message 141A in response to determining that the Node 100A is not authentic. In embodiments where the Master System 300 does not retain or have access to a local copy of R 210, the Master System 300 may employ the authentication mechanism described in connection with FIG. 2C.

Alternatively, or in addition to extracting R 210 from the IDC-I 220A, the Master System 300 may extract ID1 201A from the IDC-I 220A. Accordingly, it may determine the EV 324 by inputting to the inverse function $f_1^{-1}$ 320 the Master System's 300 local copy of R 210 and IDC-I 220A. The Master System 300 may then check 344 the EV 324 against ID1 311A. If Node 100A is authentic, then the EV 324 must be the same as ID1 201A, and therefore will result in a match, in which case the Master System 300 may send the authentication success message 140A to Node 100A in response to the authentication request 130A; otherwise, the Master System 300 may send the authentication fail message 141A to Node 100A in response to the authentication request 130A.

According to a further alternative embodiment, the Master System 300 may generate a local copy (not shown) of IDC-I using its own copy of a random number and ID1 311A. The Master System 300 may therefore directly compare the IDC-I 220A received from the Node 100A with its local copy of IDC-I.

In a related embodiment where a direct IDC-I comparison is used, the Master System 300 and the Node 100A may generate IDC-I 220A and a local copy, respectively, and each may process the corresponding IDC-I code through a hash algorithm to arrive at corresponding hash values. The hash algorithm may be, for example, an OR function (e.g. {110010 . . . }) of an intrinsic ID (e.g. {01000 . . . }) and a random number (e.g. {100010 . . . }). Optionally, the OR function may include an offset. The Master System 300 may receive the hash value from the Node 100A and compare it with its own hash value. If they match, the Node 100A will be deemed authentic; otherwise, authentication will fail. In a related embodiment, the intrinsic ID generated by the chip 110A may be hashed and compared to a hash value of the corresponding copy of the intrinsic ID that the Master System 300 maintains in a record.

In embodiments where a hash function is used, as described above, may be implemented in circumstances where additional security is desirable. In these embodiments, a generated or queried intrinsic ID (e.g., ID1 201A and ID1 311A, respectively) or an encrypted code based on these intrinsic IDs (e.g., IDC-I 220A) cannot be used in an inverse function to extract the intrinsic IDs or other inputs to an encryption function (e.g., $f_1$ 220 having inputs of at least R 210 or a generated or queried intrinsic ID). Accordingly, the Master System 300 and the Node 100A each may generate a code (e.g., IDC-I 220A) using an encryption function (e.g., $f_1$ 220) and inputs of a random number (e.g., R 210) and a queried intrinsic ID (e.g., ID1 311A) and a generated intrinsic ID (e.g., ID1 201A), respectively. The Master System 300 and the Node 100A may each use a hash algorithm to generate corresponding hash values. Rather than using an inverse function to decode these hash values, the Master System 300 and the Node 100A may each use these hash values in making hash-value to hash-value comparisons to authenticate one another, as described above.

The selection of which values to use to generate a code, for example, IDC-I 220A, and extract a value (e.g. EV 324) depend on particular embodiments of the present disclosure, including considerations such as whether or not it is preferable to dynamically generate a random number (or store a predetermined value). In each case however, either a generated intrinsic ID or a copy thereof may be used in corresponding functions.

Figure 2B:
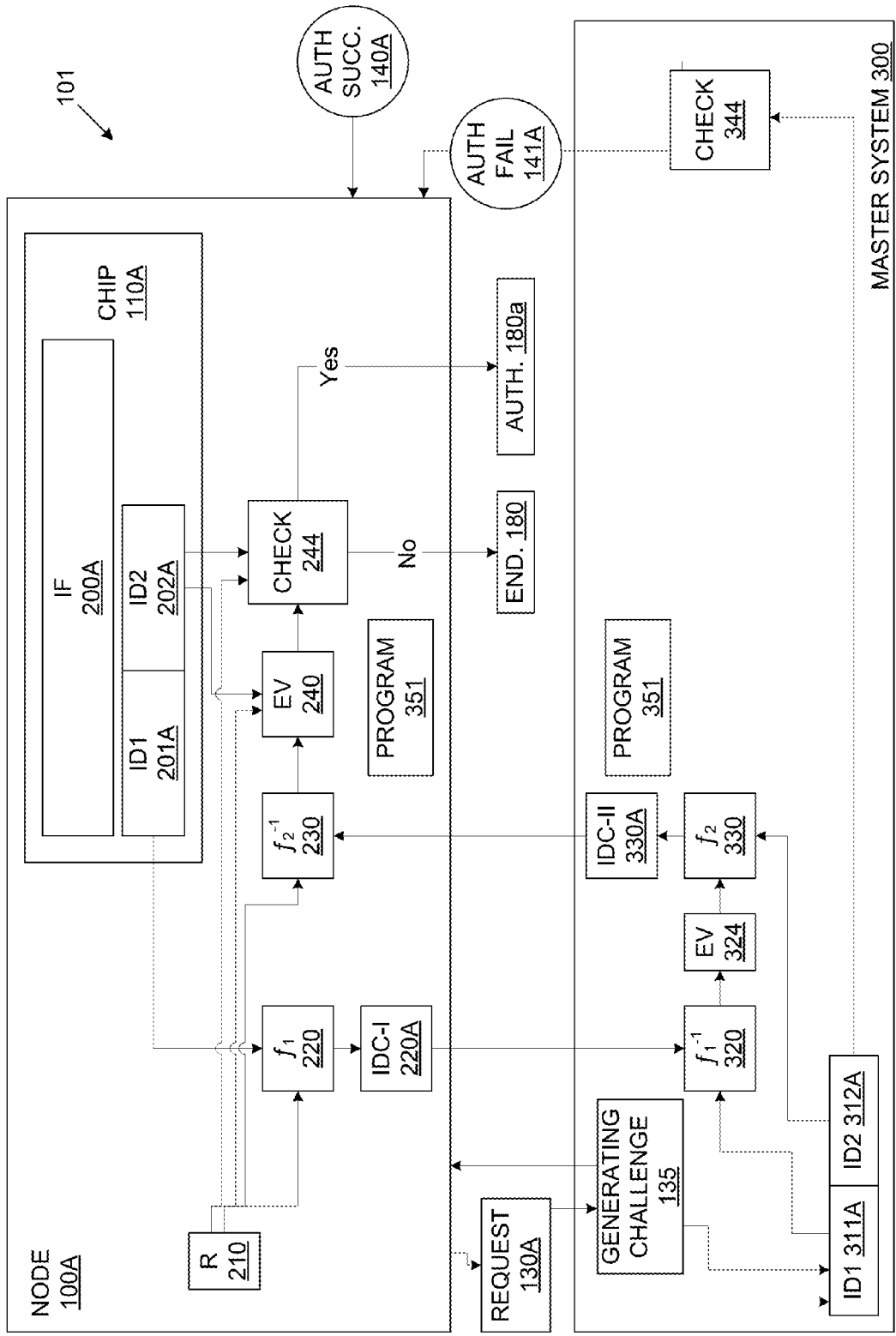
FIG. 2B is a schematic block diagram depicting a communications system using at least two intrinsic IDs, in accordance with embodiments of the present disclosure.

FIG. 2B depicts an alternative embodiment of the subset of the communications system 101 depicted in FIGS. 1 and 2A. The communications system 101 may include the components described in connection with FIG. 2A, as well as additional components. The intrinsic feature IF 200A of the Node 100A may be used to generate two, rather than just one, generated intrinsic IDs used for authentication. These may be ID1 201A, and ID2 202A.

The Node 100A may submit an authentication request 130A which the Master System 300 may receive. The Master System 300 may select a generating challenge 135 and communicate it to the Node 100A to cause it to generate its intrinsic IDs, ID1 201A and ID2 202A, using IF 200A (in related embodiments, each of these IDs may be generated based on a different generating challenge or a predetermined algorithm). The Node 100A may use ID1 201A and R 210 as inputs of the function $f_1$ 220 to produce IDC-I 220A. The Node 100A may communicate IDC-I 220A to the Master System 300.

The Master System 300 may use IDC-I 220A and ID1 311A (the latter being the Master System's local copy of chip's 110A intrinsic ID) as inputs to $f_1^{-1}$ 320 to produce EV 324. If ID1 311A is the same as ID1 201A, EV 324 will equal R 210. As discussed above in connection with FIG. 2A, R 210 may be locally stored or generated by the Master System 300, or may be obtained by the Master System 300 from an external source. Accordingly, there is an indication that the Node 100A is authentic, and the Master System 300 may generate a corresponding authentication success message 140A.

Subsequently, the Master System 300 may use EV 324 and ID2 312A as inputs to a second invertible function $f_2$ 330, such that $f_2$ (ID2 312A, EV 324) generates an output of a second identification code called IDC-II 330A. The function $f_2$ 330 may be a function similar to $f_1$ 220 that has a corresponding inverse $f_2^{-1}$ 230 function. The IDC-II 330A value may be transmitted to Node 100A. Similar to IDC-I 220A, the second identification code IDC-II 330A may be encrypted before transmission using techniques known in the art. In addition to generating and transmitting IDC-II 330A, the Master System 300 may perform the authentication functions described in connection with FIG. 2A. Alternatively, the Master System 300 may withhold an authentication determination until further authentication functions have been carried out (for example, where the Master System 300 does not have a local copy of the random number R 210).

With continued reference to FIG. 2B, the Node 100A may receive IDC-II 330A from the Master System 300. The Node 100A may use the inverse $f_2^{-1}$ 230 function to extract an EV 240 value (where EV stands for "Extracted Value"). In determining the value of EV 240, the Node 100A may use $f_2^{-1}$ (IDC-II 330A, R 210), or $f_2^{-1}$ (IDC-II 330A, ID2 202A). If the Node 100A and the Master System 300 are both authentic, then in the first case, EV 240 will be a value equal to ID1 201A, and in the second case, EV 240 will be a value equal to R 210. Therefore, the Node 100A may perform a check 244 to compare EV 240 to ID2 202A or to R 210. The Node 100A may perform both checks, but this is not necessary. If the check 244 is successful (i.e., if there is a match), the Node 100A may make an authentication determination 180a that the Master System 300 is authentic. Otherwise, it may determine that the Master System 300 is not authentic and it may end 180 its communication with the Master System 300. This functionality provides the Node 100A protection against an inauthentic Master System 300, such that even if the Master System 300 determines the Node 100A to be authentic, the Node 100A does not necessarily have to trust the Master System 300, and can make its own determination about whether it should communicate with another node (e.g., Node 100B).

Figure 2C:
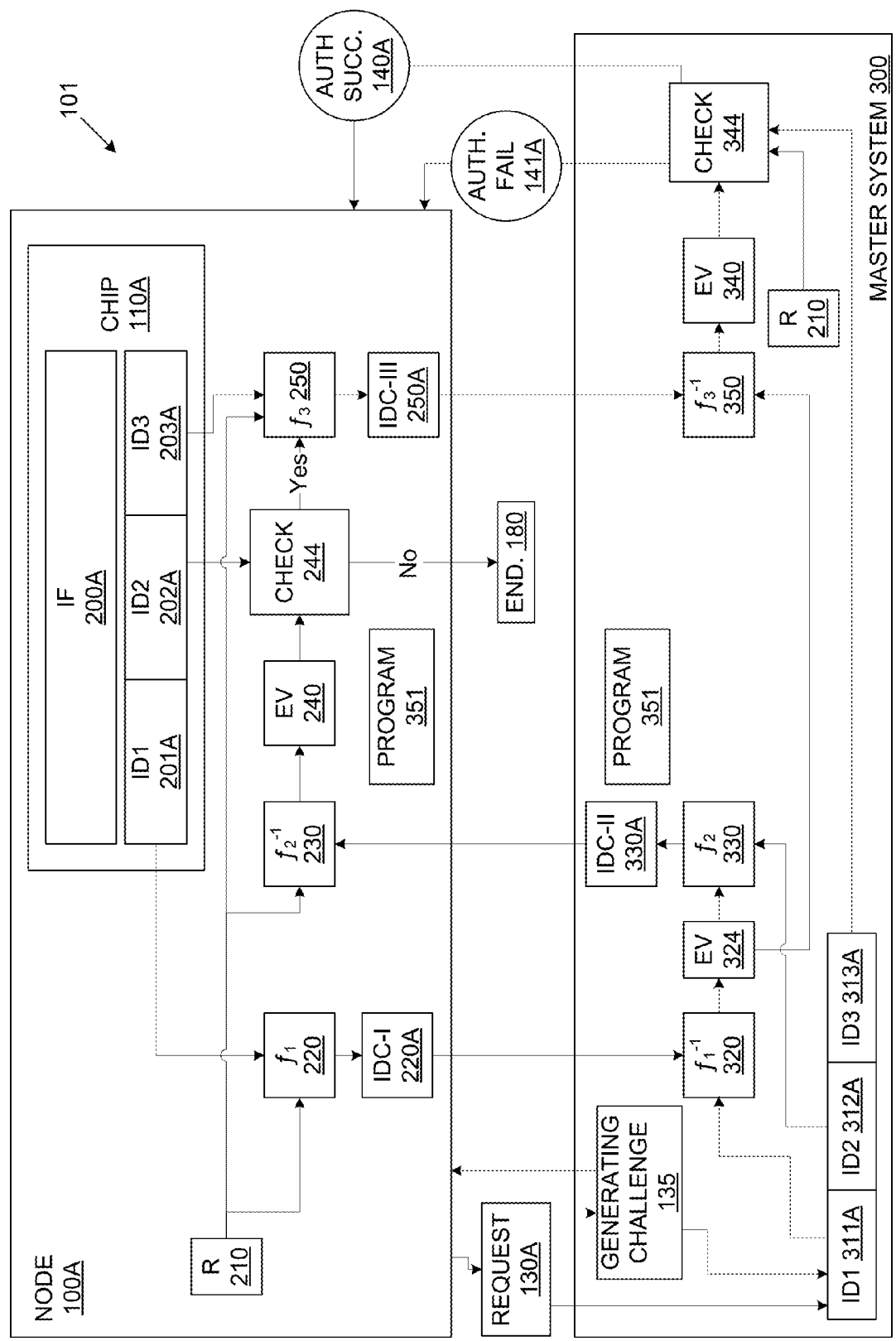
FIG. 2C is a schematic block diagram depicting a communications system using at least three intrinsic IDs, in accordance with embodiments of the present disclosure.

FIG. 2C depicts an alternative embodiment of the communications system 101 depicted in FIGS. 1-2B. The communication system 101 may include components and functionality described in connection with FIGS. 1-2B, and may contain additional or alternative components and functionality, as described herein. The Master System 300 may communicate the generating challenge 135 in response to the request 130A for authentication from Node 100A. In response to the generating challenge 135, the Node 100A may generate intrinsic IDs ID1 201A, ID2 202A, and ID3 203A, using IF 200A (and/or other IFs of the chip 110A) and a predetermined algorithm (which may be the generating challenge 135). Alternatively, these three intrinsic IDs may be generated separately in response to three different generating challenges 135, using one IF 200A. The Master System 300 may have stored (or may otherwise have access to) corresponding copies of these IDs, including ID1 311A, ID2 312A, and ID3 313A, in a record. If both the Master System 300 and the Node 100A are authentic, then stored copies of the intrinsic IDs maintained by the Master System's 300 will match the intrinsic IDs generated by the Node 100A/chip 110A.

The Node 100A may generate IDC-I 220A by using $f_1$ (ID1 201A, R 210), and transmit it to the Master System 300. The Master System 300 may perform the authentication functions described in connection with FIG. 2A. Alternatively, or in addition thereto, the Master System 300 may generate IDC-II 330A and transmit it to the Node 100A, as described in connection with FIG. 2B. Alternatively, or in addition thereto, the Node 100A may, upon determining a match in the check 244, generate a third code IDC-III 250A using a third invertible function $f_3$ 250, having inputs of R 210 and ID3 203A. The Master System 300 may receive IDC-III 250A and use it as an input to an inverse function $f_3^{-1}$ 350, along with ID3 313A or the Master System's 300 local copy or R 210, such that $f_3^{-1}$ (IDC-III 250A, ID3 313A) generates an EV 340 (where EV stands for "Extracted Value") equal to the Master System's 300 local copy of R 210 (if the Node 100A is authentic), and $f_3^{-1}$ (IDC-III 250A, ID3 313A) generates an EV 340 equal to ID3 313A (if the Node 100A is authentic). Depending on the inputs to $f_3^{-1}$ 350, the Master System 300 may perform the check 344 to compare EV 340 either to its local copy of R 210, or to ID3 313A, or to both (although this is not necessary). If the result of the check 344 is positive (i.e., there is a match), the Master System 300 may generate an authentication success signal 140A and send it the Node 100A, and otherwise may generate an authentication fail signal 141A and send it to the Node 100A.

Referring now to FIGS. 1-2C, the same authentication and/or communication request and grant/deny procedures carried out by the Master System 300 and the Node 100A may be carried out by the Master System 300 and the Node 100B to authenticate Node 100B and for Node 100B to authenticate the Master System 300 (for example, by making a Request 130B and receiving an authentication success message 140B or authentication fail message 141B). Upon the Node 100B being authenticated, the Master System 300 may send a permission granted signal 150 to both Node 100A and Node 100B signaling successful identification of both nodes.

After both Node 100A and Node 100B are granted the permission to communicate, they may begin to communicate with each other using industry standard secure cryptographic communication protocols.

During an established communication between one or more nodes 100, any first node of the system 101 (for example, Node 100A or Node 100B) may request that the Master System 300 re-authenticate a second node with which the first node is in communication. In such a case, the Master System 300 may request identification from the second node. At this point the entire authentication and/or communication request protocol described above may be taken up once again.

Figure 2D:
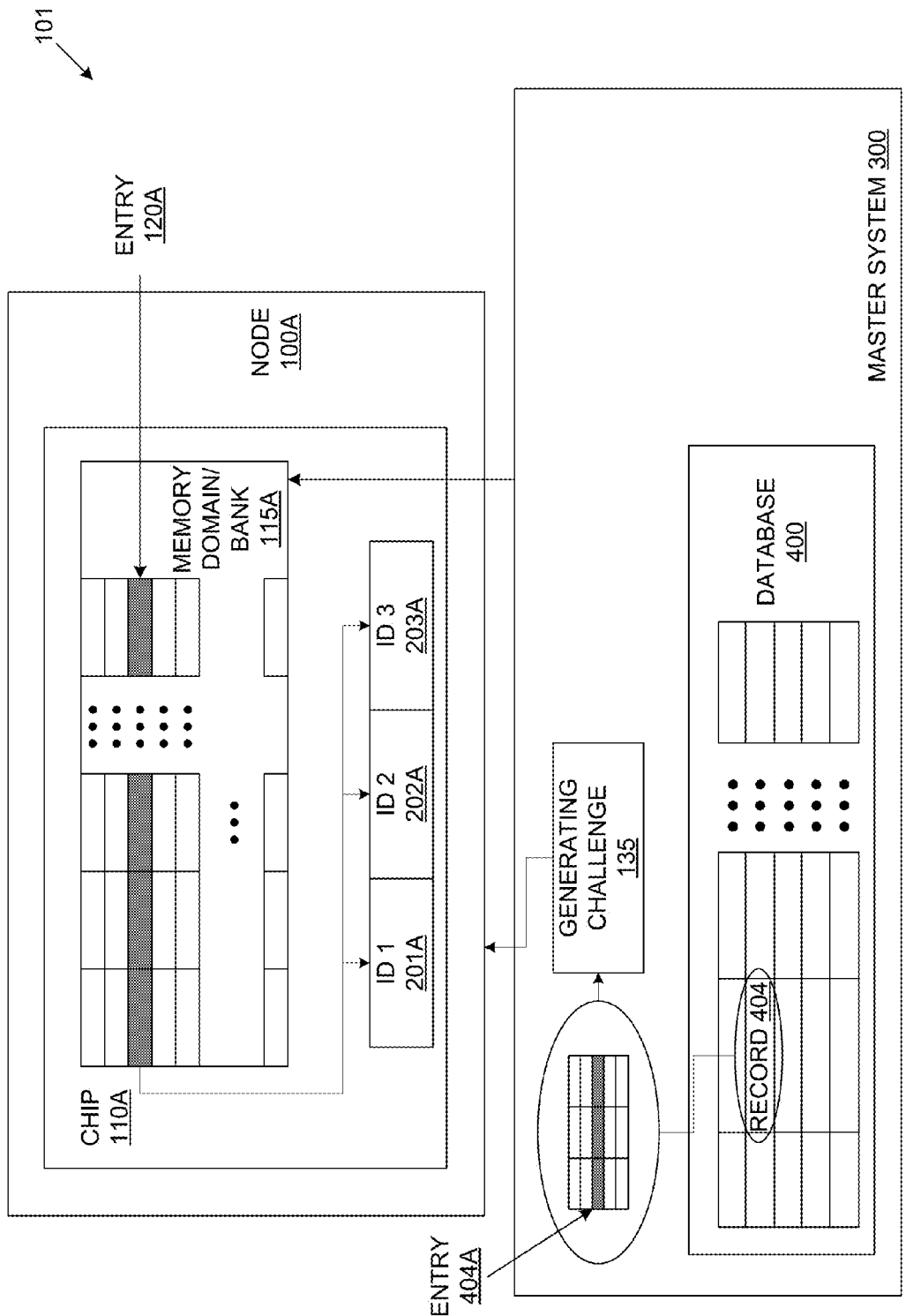
FIG. 2D is a schematic block diagram depicting a communications system using one or more intrinsic IDs, in accordance with embodiments of the present disclosure.

FIG. 2D illustrates an exemplary embodiment of the communications system 101 of FIG. 1 and FIGS. 2A-C, and also depicts additional details of the Node 100A and the Master System 300. According to the embodiment depicted in FIG. 2D, the Node 100A intrinsic feature IF 200A of the memory domain or bank 115A may be used to generate a corresponding intrinsic ID using large on-board memory systems such as a cache or the random access memory, making use of some unique property of its constituent SRAM or DRAM cells. The three different unique IDs, for example, ID1 201A, ID2 202A, ID3 203A, may be preferably generated by the same generating challenge 135 on different sections of the chip 110A such as different banks or domains 115A of the memory. The memory domain/bank 115A may include an entry 120A that can be used to generate corresponding intrinsic IDs, including, for example, ID1 201A, ID2 202A, and ID3 203A.

Upon receiving a communication request from Node 100A, the Master System 300 may query its database 400 and retrieve a Record 404 that is associated with the Node 100A. The Record 404 may have a number of entries that contain copies of intrinsic IDs of the Node 100A, each entry associated with a different generating challenge 135. The Record 404 may have, for example, an entry 404A having a corresponding generating challenge 135. The selection of the entry 404 out of many entries of the Record 400 may be based on a predetermined algorithm known to both the Master System 300 and the Node 100A. The entry 404A may correspond, for example, to the IDs ID1 311A, ID2 312A, and ID3 313A (also depicted in FIG. 2C). The generating challenge 135 associated with the entry 404A may be communicated to the Node 100A by the Master System 300.

Referring now generally to FIGS. 2A-C, the functions $f_1$ 220, $f_2$ 330, and $f_3$ 250 each may be an invertible function, including an XOR function or an offset function (e.g., a bit-shift operation). For each such function, so long as its result and one of its inputs are known, the other input can be determined using a corresponding inverse function. Such function's output may be further modified by multiplying or adding the output by a constant value. The inverse functions $f_1^{-1}$ 320, $f_2^{-1}$ 230, and $f_3^{-1}$ 350 each may be the inverse function of division of $f_1$ 220, $f_2$ 330, and $f_3$ 250, respectively, and may further include, for example, division or subtraction by the same constant value.

In an alternate embodiment, the generating challenge 135 or a part thereof, supplied by the Master System 300, may be used to dynamically select the functions $f_1$ 220, $f_2$ 330, and $f_3$ 250 from a set of predefined functions. The predefined functions may be available to both the Master System 300 and each of the Nodes 100 of the system 101.

In an alternate embodiment, the functions $f_1$ 220, $f_2$ 330, and $f_3$ 250 could be identical functions.

Referring again to FIGS. 1-2C, according to an alternate embodiment of the disclosure, authentication by the Master System 300 may be performed in the following manner: The chip 110A may generate the IDC-I 220A value, i.e., the product of $f_1$ (ID1 201A, R 210) and transmit it to the Master System 300. The Master System 300 may extract from the transmitted IDC-I 220A value the value of R 210 by using $f_1^{-1}$ 320, as described above, with the extracted value being EV 324. The Master 300 may then generate the IDC-II 330A value using the values of ID2 312A and IDC-I 220A. Hence, the IDC-II 330A may be formed according to $f_2$ (ID2 312A, IDC-I 220A), which may also be described as $f_2$ (ID2 312A, $f_1$ (R 210, ID1 201A)). This alternative IDC-II 330A value may be transmitted back to the Node 100A.

Node 100A may extract the EV 240 value from the transmitted IDC-II 330A value, to validate the Master System 300, using IDC-I 220A and R 210 as inputs to $f_2^{-1}$ 230, and then generate the IDC-III 250A according to $f_3$ (EV 240, R 210). The alternative IDC-III 250A may be transmitted to the Master System 300.

The Master System 300 may extract from the transmitted value the EV3 340 value using $f_3^{-1}$ 350 having inputs of IDC-III 250A and EV 324, and use it to authenticate Node 100A in the check 344, against the value of ID3 313A.

Accordingly, the combinations of ID1 201A, ID2 202A and R 210 may generate enough different messages (i.e., $f_1$ (ID1 201A, R 210), $f_2$ (ID2 202A, $f_1$ (R 210, ID1 201A)), $f_3$ (ID2 202A, R 210)), using only two IDs, that are hard to reverse-engineer in order to gain information about a single ID.

Referring again to FIGS. 1-2C, according to an additional embodiment of the present disclosure, the Node 100A may authenticate the Master System 300, as follows. The Node 100A may send the Master System 300 an authentication request 130A, which may be a request for the Master System 300 to send an encrypted code to the Node 100A so that the Node 100A can authenticate the Master System 300. The Master System 300 or the Node 100A may select and communicate a corresponding generating challenge 135 to one another. The encrypted code sent by the Master System 300 may be, for example, a copy of IDC-I 220A, generated by the Master System 300 using $f_1$ 220, having inputs of R 210 (using a copy of R 210 maintained/obtained by the Master System 300) and ID1 311A (which is a copy of an intrinsic ID of the chip 110A on the Node 100A, queried by the Master System 300 from a record corresponding to chip 110A and the communicated challenge 135). The Master System 300 may communicate this encrypted code to the Node 100A, and may process it through a hash algorithm prior to communication. Node 100A may, itself, generate IDC-I 220A using $f_1$ 220 using inputs of R 210 (using a copy of R 210 maintained/obtained by the Node 100A), and ID1 201A (a copy of the chip's 110A intrinsic ID, generated using the agreed upon encryption challenge 135). Node 100A may further encrypt IDC-I 220A using a hash algorithm, which may be a hash algorithm that both the Master System 300 and the Node 100A have access to and are coordinated to use. Upon receiving the encrypted code from the Master System 300, the Node 100A may compare the encrypted code to IDC-I 220A generated on the Node 100A or to a hash value thereof. If the comparison indicates a match, the Node 100A may authenticate the Master 300 and perform additional functions (not shown) based on the authentication. In this embodiment, it is not necessary for the Node 100A to send any codes, derived from an encryption challenge, to the Master System 300.

Figure 3:
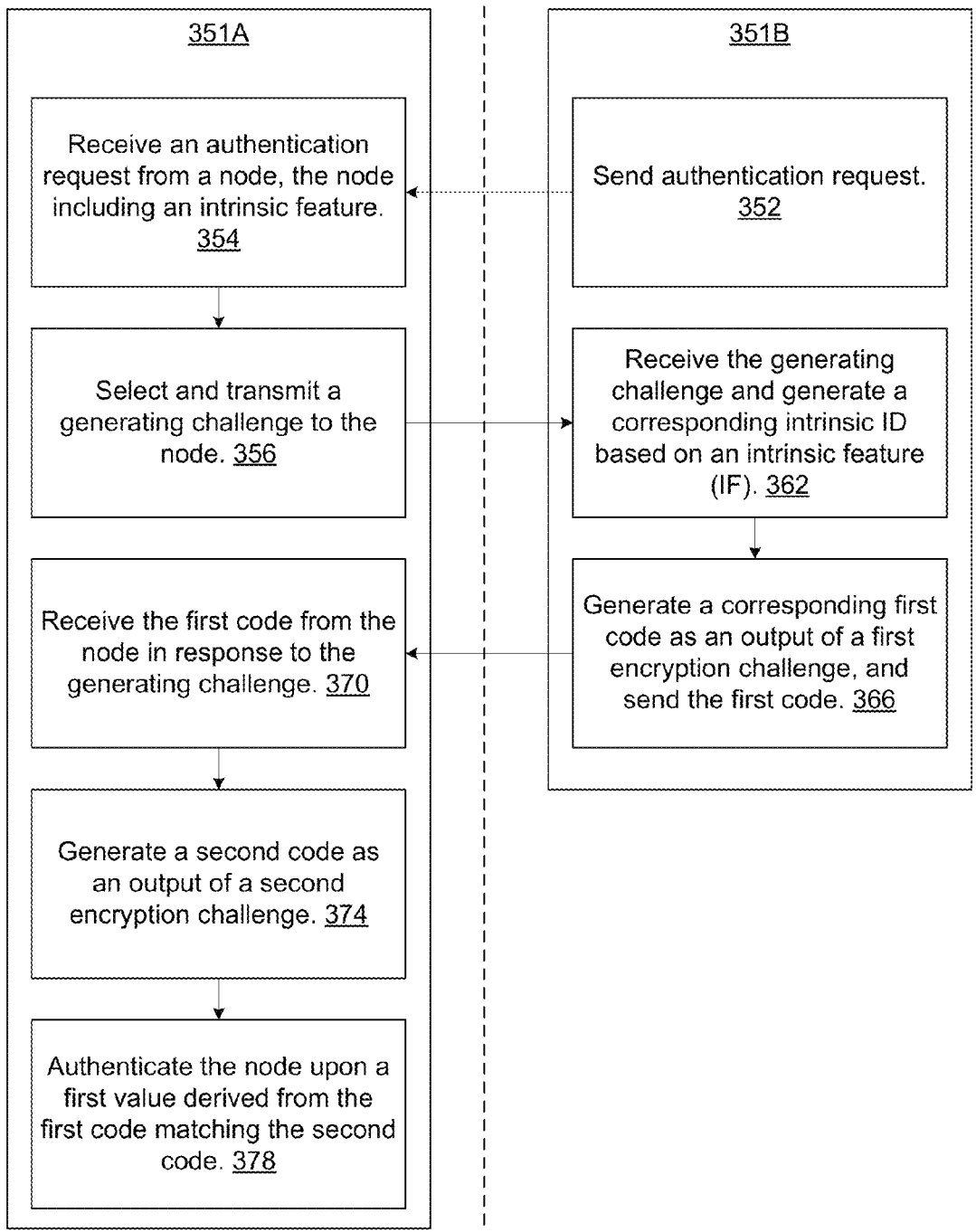
FIG. 3 is a flowchart depicting steps of a method for authenticating a node in a communications system, in accordance with embodiments of the present disclosure.

FIG. 3 depicts an exemplary embodiment of the program 351 depicted in FIGS. 2A-C that facilitates the functionality described in connection with FIGS. 1-2D. The program 351 may be embodied as a computer program operating on a node in the communications system 101, or it may be embodied on multiple nodes 100. In a multiple-node embodiment, the program 351 may include a component 351A operating on, for example, the Master System 300, and a component 351B operating, for example, on the Node 100A.

A requesting node 100 may send an authentication and/or communication request in step 352 of the component 351B to a receiving node (wherein the request may be the request 130A and the receiving node may be the Master System 300). As part of or in addition to this request, the requesting node may also send the receiving node a public ID such as a MAC address, or a manufacturer serial number. The requesting node has at least one intrinsic feature IF (e.g., IF 200A) which may be used to facilitate authentication.

The component 351A of the receiving node may receive the authentication request in step 354, along with the public ID such as a MAC address. In step 356, the component 351A may query a database (e.g., the database 400 in FIG. 2D) using the MAC address to select a generating challenge (e.g., the generating challenge 135) and one or more corresponding intrinsic IDs (e.g., the queried intrinsic IDs ID1 311A, ID2 312A, ID3 313A which may be stored in the record 404). If the requesting node is authentic, intrinsic IDs generated by the requesting node in other steps of the program 351 (e.g., the generated intrinsic IDs ID1 201A, ID2 202A, ID3 203A) will match the intrinsic IDs queried by the receiving node. In step 356, the receiving node communicates the selected generating challenge to the requesting node.

The requesting node receives the selected generating challenge in step 362. Using this generating challenge, the requesting node generates an intrinsic ID using an intrinsic feature (IF) (e.g., IF 200A) of the requesting node (e.g., the generated intrinsic IDs ID1 201A, ID2 202A, ID3 203A), or an IF of a component of the requesting node, such as a chip, and integrated circuit, or other component having an intrinsic feature (e.g., the chip 110A of the node 100A).

The requesting node uses the intrinsic ID generated in step 362 to generate a corresponding first code (e.g., IDC-I 220A), in step 366. The first code represents an output of a first encryption challenge (e.g., the function $f_1$ 220). If the requesting node is authentic, then the first code can be used by the receiving node to authenticate the requesting node. If the requesting node is not authentic, the first code will not pass a check (e.g., the check 344) performed by the receiving node in other steps of the program 351, as will be described below. The first encryption challenge may be an invertible function having inputs of a first random number (e.g., R 210) and the generated intrinsic ID (e.g. ID1 201A) of the requesting node, generated in step 362. Once generated, the first code is sent to the receiving node in step 366.

The receiving node receives the first code from the requesting node in step 370.

The receiving node generates a second code as an output of a second encryption challenge, in step 374. In step 378, a first value is derived from the first code and is compared to the second code, and the requesting node is authenticated upon the comparison indicating that the two values match.

The second code generated in step 374 and the first value derived from the first code, may be determined in several ways depending on the particular embodiment of the present disclosure, and may include, without limitation, the following.

In one aspect of the present disclosure with respect to step 374, the second code may be an output of the second encryption function, where the second and first encryption functions are the same function (e.g., $f_1$ 220) known to both the requesting and the receiving nodes. In this case, the first value derived from the first code is the first code itself (e.g., IDC-I 220A). The requesting node is authenticated, therefore, if the second code matches the first code. In a related embodiment, each of the first code and the second code may be hashed by their respective nodes prior to the receiving node receiving the first code, in which case their hash values are compared to one another.

In another aspect of the present disclosure with respect to step 374, the first value derived from the first code may be extracted (e.g., as the EV 324 value) from the first code using a first inverse encryption challenge or function (e.g., $f_1^{-1}$ 320). The first inverse encryption function may be an inverse function of the first encryption challenge or function (e.g., $f_1$ 220), wherein the first encryption function has inputs of a first random number (e.g., R 210 maintained by the node 100A) and a generated copy of the requesting node's generated intrinsic ID (e.g., ID1 201A) (the requesting node itself performing the intrinsic ID generation using an IF). In this embodiment, the receiving node may extract either of the two inputs of the first encryption function: the random number or the generated intrinsic ID. In the first case, the second code may be a generated/obtained/stored copy of the random number locally available to the receiving node (e.g., R 210 maintained by the Master System 300) (i.e., from a source other than the first code). In the second case, the second code may be the queried copy of the intrinsic ID of the requesting node (e.g., ID1 311A). In either case, the receiving node may authenticate the requesting node upon the first value (which is an extracted value) matching the second code.

The program 351 and its components 351A and 351B may include additional steps (not shown) whereby the requesting node authenticates the receiving node. In this aspect of the disclosure, the receiving node may send the second code which it generates (e.g., a code similar to IDC-I 220A generated locally by the Master System 300 using a function such as $f_1$ 220) to the requesting node, and the requesting node may either directly compare the second code to the first code, or extract a second value (e.g., EV 240) from the second code in the same manner as the receiving node extracts the first value from the first code (using $f_1^{-1}$ 320). Alternatively, the second code generated by the receiving node may be an output of a different second encryption challenge function (e.g., $f_2$ 330) having inputs of a second queried intrinsic ID (e.g., ID2 312) and the first or second random numbers (e.g., R 210 maintained by the node 100A and extracted by the Master System 300, or R 210 maintained by the Master System 300 locally). The requesting node may generate a corresponding code (e.g., a copy of IDC-II 330A generated locally by the node 100A using $f_2$ 330) using inputs of the first random number (e.g., R 210 maintained locally by the Node 100A) and a second generated intrinsic ID (e.g., ID2 202A), and compare the second code to the corresponding code. Upon the two matching, the requesting node may authenticate the receiving node.

In an additional embodiment (not shown), the program 351 and its components may include additional authentication steps whereby the requesting node generates a third code (e.g., IDC-III 250A) using a third encryption challenge (e.g., $f_3$ 250) or function having inputs of the first random number (e.g., R 210 as maintained by the Node 100A) and a third generated intrinsic ID (e.g., ID3 203A). Alternatively, the third code may be generated using the third encryption challenge (e.g., $f_3$ 250) having at least an extracted value (e.g., EV 240) as one of its inputs, wherein the extracted value is either the second random number (e.g., R 210 from the Master System 300) or the queried copy of the second intrinsic ID (e.g., ID2 312A) used as an input to the second encryption challenge (e.g., $f_2$ 330) by the receiving node. The third code may also be generated using the second code (e.g., IDC-II 330A received from the Master System 300, or a locally generated copy thereof) as an input.

In the above embodiment, the requesting node may send the third code to the receiving node. The receiving node may extract a third value (e.g., EV 340) from the third code in the same manner as described above with respect to the first value extracted from the first code and the second value extracted from the second code. The receiving node may check (e.g., check 344) the third value against the second random number (i.e., R 210 as locally maintained by the Master System 300) or an earlier extracted random number (e.g., EV 324), or against a queried copy of a third intrinsic ID (e.g., ID3 313A). Upon a comparison indicating a match, the receiving node may authenticate the requesting node.

In yet other steps of the program 351 (not shown), the receiving node may perform one or more of the above steps to authenticate an additional node (e.g., Node 100B) with which the requesting node wishes to communicate. Upon authenticating both the requesting node and the additional node, the program 351 may permit a communication between the two, or otherwise may deny such communication.

Figure 4:
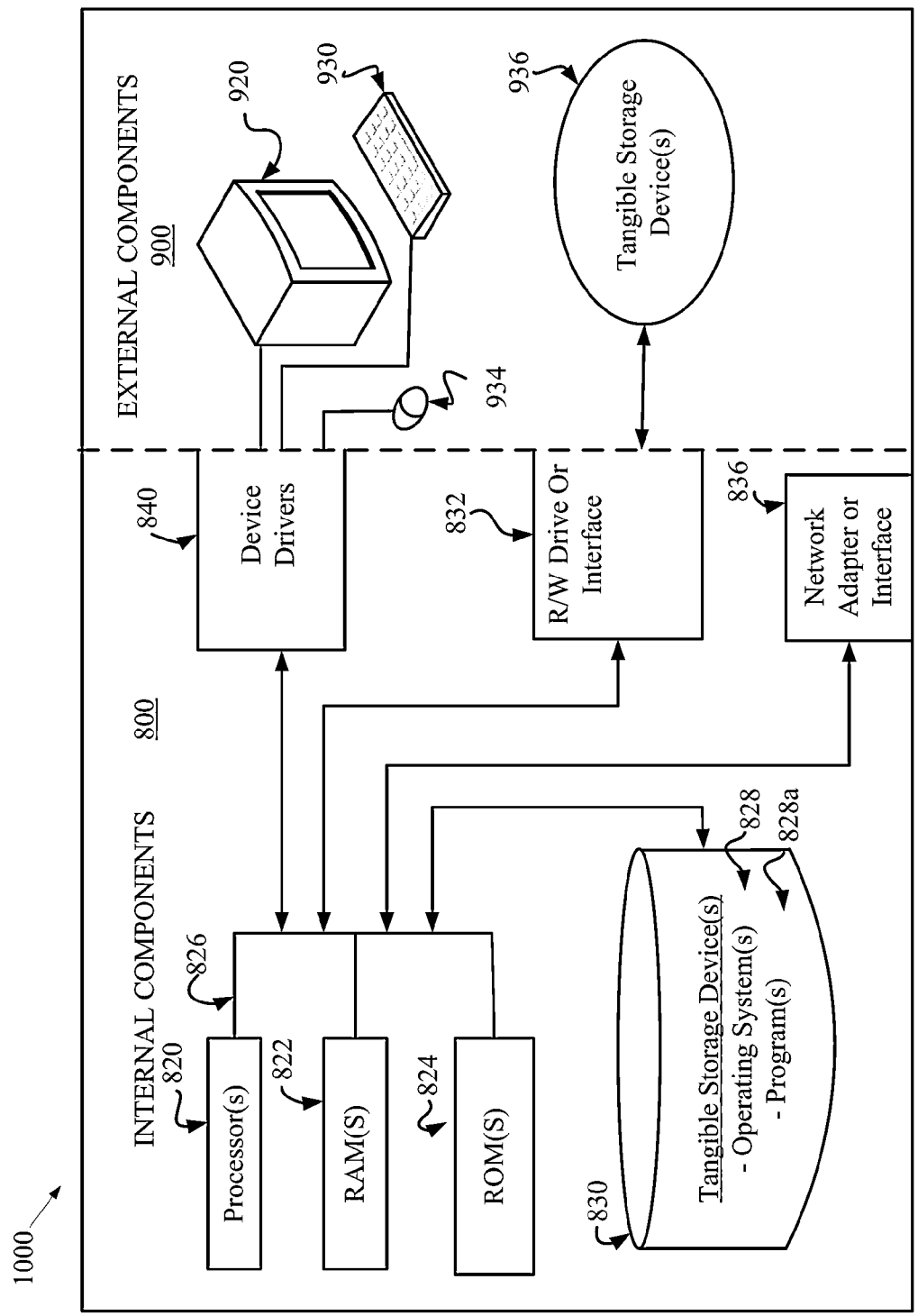
FIG. 4 is a schematic block diagram depicting a computer system, in accordance with embodiments of the present disclosure.

Referring now to FIG. 4, each one or more of the nodes, devices, and/or systems described in connection with FIGS. 1-3 may be a computing device 1000 and may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications 828a (e.g., the program 351 and its components 351A and 351B, and/or device driver modules) that execute the method 351; and one or more computer-readable tangible storage devices 830. The one or more operating systems 828 and device driver modules 840 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
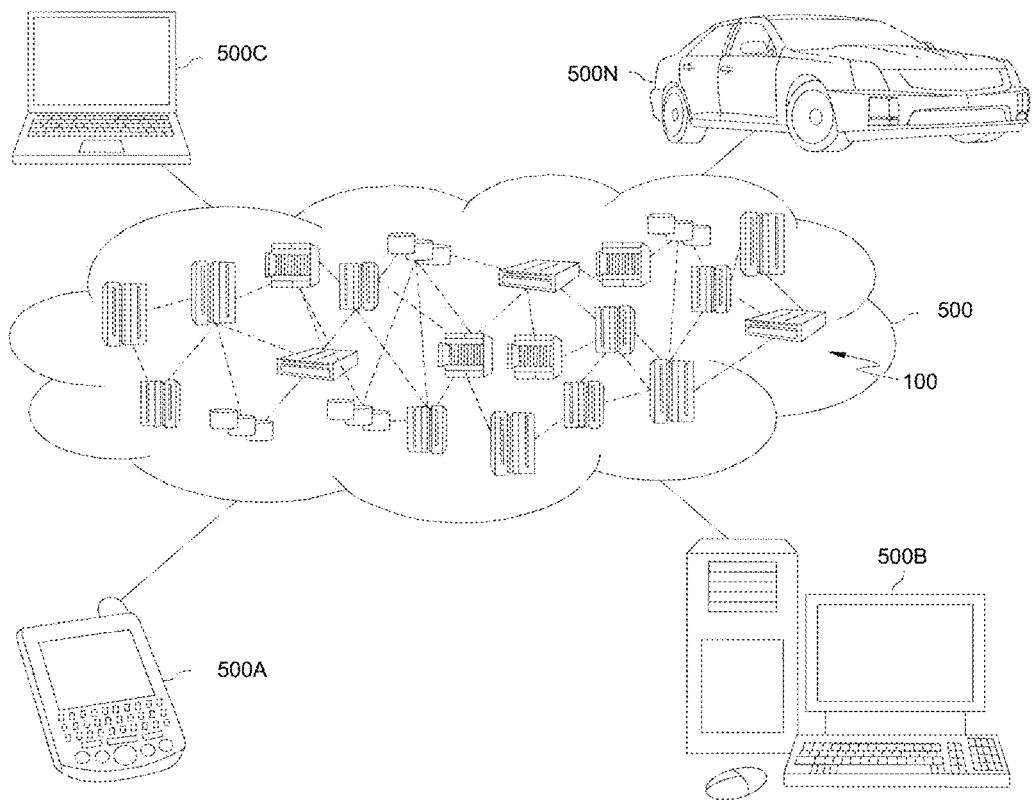
FIG. 5 is a schematic block diagram depicting an exemplary cloud computing environment, in accordance with embodiments of the present disclosure.

Referring now to FIG. 5, an illustrative cloud computing environment 500 is depicted. As shown, the cloud computing environment 500 comprises one or more cloud computing nodes, each of which may be a system 1000 (FIG. 4) with which local computing devices used by cloud consumers, such as, for example, a personal digital assistant (PDA) or a cellular telephone 500A, a desktop computer 500B, a laptop computer 500C, and/or an automobile computer system 500N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that the computing nodes 1000 and the cloud computing environment 500 can communicate with any type of computerized device over any type of network and/or network addressable connection (e.g., using a web browser).

Figure 6:
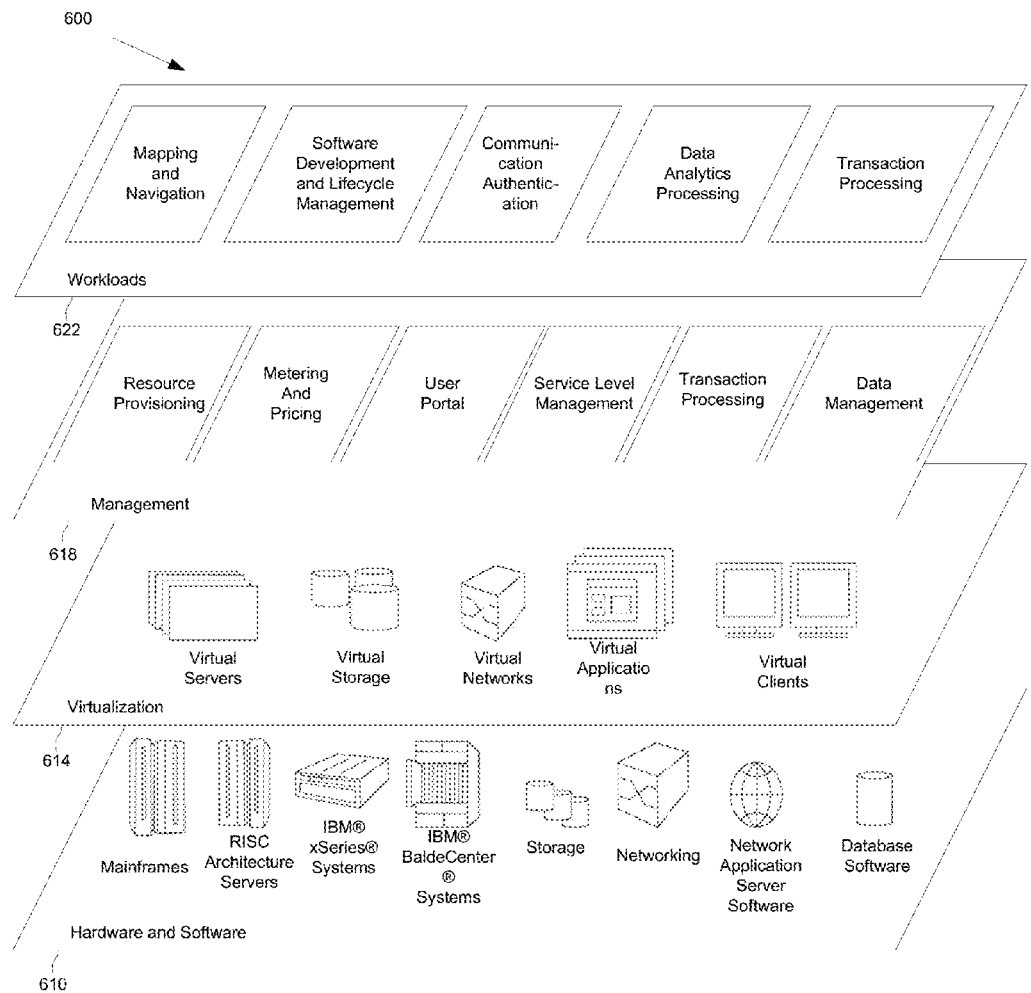
FIG. 6 is a schematic block diagram depicting a multi-layer functional embodiment of the cloud computing environment of FIG. 5, in accordance with embodiments of the present disclosure.

Referring now to FIG. 6, a set of functional abstraction layers provided by the cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

The hardware and software layer 610 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 614 provides an abstraction layer from which the following examples of virtual entities may be provided: virtual servers; virtual storage; virtual networks, including virtual private networks; virtual applications and operating systems; and virtual clients.

In one example, the management layer 618 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 622 provides examples of functionality for which the cloud computing environment may be utilized. Examples of workloads and functions which may be provided from this layer include: mapping and navigation; software development and lifecycle management; virtual classroom education delivery; data analytics processing; transaction processing; and communication authentication such as that provided by embodiments of the present disclosure depicted in and discussed in connection with FIGS. 1-5.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

We claim:

1. A computer implemented method for authenticating a node in an electronic communications system, the method comprising:

receiving an authentication request from a node;

transmitting a generating challenge to the node, wherein the generating challenge prompts the node to generate a first code representing an output of a first encryption challenge having inputs that include a random value and a first intrinsic ID based on an intrinsic feature, wherein the first encryption challenge is an invertible function;

receiving the first code from the node in response to the generating challenge;

generating a second code as an extracted value from an inverse function, wherein the second code represents an output of a second encryption challenge having inputs that include at least two of:

the first code, the random value, and a second intrinsic ID, wherein the second intrinsic ID is obtained from a source other than the node, and wherein the random value comprises one of an external value transmitted to the node and the electronic communications system, or a value generated in each of the electronic communications system and the node using a same seed input; and authenticating the node, using a check function, based on one or more of:

the second encryption challenge having inputs of the random value and the second intrinsic ID, and the second code matching the first code;

the second encryption challenge having inputs of the first code and the random value, and the second code matching the second intrinsic ID; and the second encryption challenge having inputs of the first code and the second intrinsic ID, and the second code matching the random value;

whereby the first intrinsic ID matches the second intrinsic ID.

2. The method of claim 1, wherein:

the intrinsic feature is an intrinsic feature of the node;

the first intrinsic ID is an intrinsic ID of the node dynamically generated by the node based on the intrinsic feature of the node using the generating challenge; and the second intrinsic ID is obtained from a database record associated with the generating challenge and the node, wherein the database record is not maintained on the node.

3. The method of claim 1, wherein:

the first intrinsic ID is obtained from a database record associated with the generating challenge, wherein the database record is obtainable by the node; and the second intrinsic ID is dynamically generated using the generating challenge based on the intrinsic feature.

4. The method of claim 1, wherein:

the second code is the output of the second encryption challenge having inputs of the random value and the second intrinsic ID; and authenticating the node is based on a hashed value of the first code matching a hashed value of the second code, wherein the hashed value of the first code and the hashed value of the second code are generated using a hash algorithm.

5. The method of claim 1, further comprising:

transmitting a plurality of additional generating challenges to the node, wherein the plurality of additional generating challenges prompt the node to generate a corresponding plurality of intrinsic IDs of the node;

receiving encrypted copies of the plurality of intrinsic IDs;

decrypting the encrypted copies of the plurality of intrinsic IDs to generate a corresponding plurality of decrypted values; and authenticating the node based on each of the plurality of decrypted values matching a corresponding intrinsic ID obtained from a source other than the node.

6. The method of claim 1, wherein the intrinsic feature includes one or more of: a power-up voltage value of SRAM, pairings of ring-oscillator PUPs values, DRAM retention fail counts, a result of a race condition in an arbiter-PUP, and an optical speckle of a disordered three-dimensional microstructure.

7. A system for authenticating a node in an electronic communications system, the system comprising:

a computer having a processor and a tangible storage device; and a program embodied on the storage device for execution by the processor, the program having a plurality of modules, the plurality of modules including:

a receiving module configured to receive an authentication request from a node;

a transmitting module configured to transmit a generating challenge to the node, wherein the generating challenge prompts the node to generate a first code representing an output of a first encryption challenge having inputs that include a random value and a first intrinsic ID based on an intrinsic feature, wherein the first encryption challenge is an invertible function;

a second receiving module configured to receive the first code from the node in response to the generating challenge;

a generating module configured to generate a second code as an extracted value from an inverse function, wherein the second code represents an output of a second encryption challenge having inputs that include at least two of:

the first code, the random value, and a second intrinsic ID, wherein the second intrinsic ID is obtained from a source other than the node, and wherein the random value comprises one of an external value transmitted to the node and the electronic communications system, or a value generated in each of the electronic communications system and the node using a same seed input; and an authenticating module configured to authenticate the node, using a check function, based on one or more of:
the second encryption challenge having inputs of the random value and the second intrinsic ID, and the second code matching the first code;
the second encryption challenge having inputs of the first code and the random value, and the second code matching the second intrinsic ID; and
the second encryption challenge having inputs of the first code and the second intrinsic ID, and the second code matching the random value;
whereby the first intrinsic ID matches the second intrinsic ID.

8. The system of claim 7, wherein:
the intrinsic feature is an intrinsic feature of the node;
the first intrinsic ID is an intrinsic ID of the node dynamically generated by the node based on the intrinsic feature of the node using the generating challenge; and
the second intrinsic ID is obtained from a database record associated with the generating challenge and the node, wherein the database record is not maintained on the node.

9. The system of claim 7, wherein:
the first intrinsic ID is obtained from a database record associated with the generating challenge, wherein the database record is obtainable by the node; and
the second intrinsic ID is dynamically generated using the generating challenge based on the intrinsic feature.

10. The system of claim 7, wherein:
the second code is the output of the second encryption challenge having inputs of the random value and the second intrinsic ID; and
authenticating the node is based on a hashed value of the first code matching a hashed value of the second code, wherein the hashed value of the first code and the hashed value of the second code are generated using a hash algorithm.

11. The system of claim 7, further comprising:
transmitting a plurality of additional generating challenges to the node, wherein the plurality of additional generating challenges prompt the node to generate a corresponding plurality of intrinsic IDs of the node;
receiving encrypted copies of the plurality of intrinsic IDs;
decrypting the encrypted copies of the plurality of intrinsic IDs to generate a corresponding plurality of decrypted values; and
authenticating the node based on each of the plurality of decrypted values matching a corresponding intrinsic ID obtained from a source other than the node.

12. The system of claim 7, wherein the intrinsic feature includes one or more of: a power-up voltage value of SRAM, pairings of ring-oscillator PUFs values, DRAM retention fail counts, a result of a race condition in an arbiter-PDF, and an optical speckle of a disordered three-dimensional microstructure.

13. A computer program product for authenticating a node in an electronic communications system, the computer program product comprising a tangible storage non-transitory computer-readable device having program code embodied therewith, the program code executable by a processor of a computer to perform a method, the method comprising:
receiving, by the processor, an authentication request from a node;
transmitting a generating challenge to the node, wherein the generating challenge prompts the node to generate a first code representing an output of a first encryption challenge having inputs that include a random value and a first intrinsic ID based on an intrinsic feature, wherein the first encryption challenge is an invertible function;
receiving, by the processor, the first code from the node in response to the generating challenge;
generating, by the processor, a second code as an extracted value from an inverse function, wherein the second code represents an output of a second encryption challenge having inputs that include at least two of: the first code, the random value, and a second intrinsic ID, wherein the second intrinsic ID is obtained from a source other than the node, and
wherein the random value comprises one of an external value transmitted to the node and the electronic communications system, or a value generated in each of the electronic communications system and the node using a same seed input; and
authenticating, by the processor, the node using a check function based on one or more of:
the second encryption challenge having inputs of the random value and the second intrinsic ID, and the second code matching the first code;
the second encryption challenge having inputs of the first code and the random value, and the second code matching the second intrinsic ID; and
the second encryption challenge having inputs of the first code and the second intrinsic ID, and the second code matching the random value;
whereby the first intrinsic ID matches the second intrinsic ID.

14. The computer program product of claim 13, wherein:
the intrinsic feature is an intrinsic feature of the node;
the first intrinsic ID is an intrinsic ID of the node dynamically generated by the node based on the intrinsic feature of the node using the generating challenge; and
the second intrinsic ID is obtained from a database record associated with the generating challenge and the node, wherein the database record is not maintained on the node.

15. The computer program product of claim 13, wherein:
the first intrinsic ID is obtained from a database record associated with the generating challenge, wherein the database record is obtainable by the node; and
the second intrinsic ID is dynamically generated using the generating challenge based on the intrinsic feature.

16. The computer program product of claim 13, wherein:
the second code is the output of the second encryption challenge having inputs of the random value and the second intrinsic ID; and
authenticating the node is based on a hashed value of the first code matching a hashed value of the second code, wherein the hashed value of the first code and the hashed value of the second code are generated using a hash algorithm.

17. The computer program product of claim 13, further comprising:
transmitting a plurality of additional generating challenges to the node, wherein the plurality of additional generating challenges prompt the node to generate a corresponding plurality of intrinsic IDs of the node;

receiving encrypted copies of the plurality of intrinsic IDs;

decrypting the encrypted copies of the plurality of intrinsic IDs to generate a corresponding plurality of decrypted values; and authenticating the node based on each of the plurality of decrypted values matching a corresponding intrinsic ID obtained from a source other than the node.

18. The computer program product of claim 13, wherein the intrinsic feature includes one or more of: a power-up voltage value of SRAM, pairings of ring-oscillator PUFs values, DRAM retention fail counts, a result of a race condition in an arbiter-PDF, and an optical speckle of a disordered three-dimensional microstructure.

* * * * *